US007903125B1

(12) United States Patent
Ayers et al.

(10) Patent No.: US 7,903,125 B1
(45) Date of Patent: Mar. 8, 2011

(54) COMPACT CLUSTERED 2-D LAYOUT

(75) Inventors: Robert M. Ayers, San Jose, CA (US);
Gregg D. Wilensky, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 715 days.

(21) Appl. No.: 11/622,425

(22) Filed: Jan. 11, 2007

Related U.S. Application Data

(60) Provisional application No. 60/776,007, filed on Feb. 7, 2006.

(51) Int. Cl.
*G09G 5/00* (2006.01)

(52) U.S. Cl. .......................................... 345/629; 345/441

(58) Field of Classification Search .......... 345/441–443, 345/629–641
See application file for complete search history.

(56) References Cited

U.S. PATENT DOCUMENTS

| | | | | |
|---|---|---|---|---|
| 5,543,935 A | * | 8/1996 | Harrington | 358/3.07 |
| 5,602,943 A | * | 2/1997 | Velho et al. | 382/266 |
| 5,638,498 A | * | 6/1997 | Tyler et al. | 358/1.18 |
| 6,211,889 B1 | | 4/2001 | Stoutamire | |
| 6,301,586 B1 | * | 10/2001 | Yang et al. | 707/104.1 |
| 6,323,874 B1 | * | 11/2001 | Gossett | 345/619 |
| 6,335,742 B1 | * | 1/2002 | Takemoto | 715/781 |
| 6,460,026 B1 | * | 10/2002 | Pasumansky | 707/1 |
| 6,470,287 B1 | * | 10/2002 | Smartt | 702/102 |
| 7,256,799 B2 | * | 8/2007 | Hatanaka et al. | 345/629 |

OTHER PUBLICATIONS

Hilbert Curve—Wikipedia Encyclopedia [online], [retrieved on Dec. 31, 2007]. 4 pages. Retrieved from Internet <URL: http://en.wikipedia.org/w/index.php?title=Hibert_curve&printable=yes.

* cited by examiner

*Primary Examiner* — Xiao M Wu
*Assistant Examiner* — Charles Tseng
(74) *Attorney, Agent, or Firm* — Fish & Richardson P.C.

(57) ABSTRACT

Methods and apparatus, including computer program products, for receiving user selection of an ordering for a plurality of objects. Each object in the plurality having one or more associated attributes and an associated visual representation. The selected ordering specifies a sequential arrangement of the plurality of objects based on one or more values associated with each of the one or more associated attributes. The sequential arrangement is presented in a visual presentation by presenting for each object in the sequential arrangement the associated visual representation at a position on a path defined by a space filling curve and according to the sequential arrangement.

16 Claims, 8 Drawing Sheets

COMPACT CLUSTERED 2-D LAYOUT

CROSS-REFERENCE TO RELATED APPLICATIONS

This application claims priority to U.S. Provisional Application Ser. No. 60/776,007, filed on Feb. 7, 2006. The disclosure of the above application is incorporated herein by reference in its entirety.

BACKGROUND

Visually identifying similarities in a data set can be cumbersome if the number of data points to consider is large. For example, images can be sorted based on one or more attributes of the images, such as a color value, and then viewed in sorted order in a continuous sequence so that users can see images with similar color values grouped together consecutively. However, for a large number of images, it can be impossible to view all of the images at once without scaling them small enough so that they fit across the width of a computer display, for example. But the images may be scaled so small that they lose any meaningful detail. Another way to present a sorted sequence of images is to break the sequence into a number of rows. But if the images are broken up by row by row, then the images above and below a current image may not have a close color value to a current image, hence it can be difficult for users to discern which images have color values close to one another.

SUMMARY

In general, in one aspect, the invention features receiving user selection of an ordering for a plurality of objects. Each object in the plurality having one or more associated attributes and an associated visual representation. The selected ordering specifies a sequential arrangement of the plurality of objects based on one or more values associated with each of the one or more associated attributes. The sequential arrangement is presented in a visual presentation by presenting for each object in the sequential arrangement the associated visual representation at a position on a path defined by a space filling curve and according to the sequential arrangement.

One embodiment can be implemented to include one or more of the following advantageous features. The distance between any two visual representations in the visual presentation is proportional to the distance between the corresponding objects in the sequential arrangement. A user action is received to insert a new visual representation associated with a new object in the visual presentation. The sequential arrangement is modified by adding the new object to the sequential arrangement at a location determined by the selected ordering. Presenting the modified sequential arrangement in the visual presentation by presenting for each object in the sequential arrangement the associated visual representation at a position on the path defined by the space filling curve. An attribute is one or more of: text, an image property, metadata, an object creation date, an object modification date, or determined by attributes of two or more objects.

Embodiments can be implemented to include one or more of the additional advantageous features. User selection of a visual representation in the visual presentation is received. The sequential arrangement is modified by removing the object associated with the visual representation from the sequential arrangement. The modified sequential arrangement is presented in the visual presentation by presenting for each object in the sequential arrangement the associated visual representation at a position on the path defined by the space filling curve. A visual representation occupies one cell in the visual presentation. A visual representation is presented in more than one consecutive cell along the path if the visual representation is larger than a single cell. One or more visual representations are distributed so as to compensate for empty space. An object incorporates one or more of: text, an image, sound, a web page or a document.

In general, in another aspect, the invention features receiving user selection of an ordering for a plurality of objects. Each object in the plurality having one or more associated attributes and an associated visual representation. The selected ordering specifies a sequential arrangement of the plurality of objects based on one or more values associated with each of the one or more associated attributes. The sequential arrangement is presented in a visual presentation by presenting for each object in the sequential arrangement the associated visual representation at a position on a path defined by a space filling curve and according to the sequential arrangement. The distance between any two visual representations in the visual presentation is proportional to the distance between the corresponding objects in the sequential arrangement.

One embodiment of the invention can be implemented to include one or more of the following advantageous features. A visual representation occupies one cell in the visual presentation. A visual representation is presented in more than one consecutive cell along the path if the visual representation is larger than a single cell.

Particular embodiments can be implemented to realize one or more of the following advantages. Closely related objects appear near one another with a distance in proportion to the objects' nearness in a sequential ordering. Clustering is based on a single attribute set. Different sized objects can be presented in a clustered arrangement. A hierarchical arrangement of objects is visually presented in a clustered layout. Empty space in a clustered layout of objects is compensated for. A clustered layout of objects can be distributed across two or more pages and can be scrollable.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

The present disclosure relates to visually clustering related information.

Figure 1:
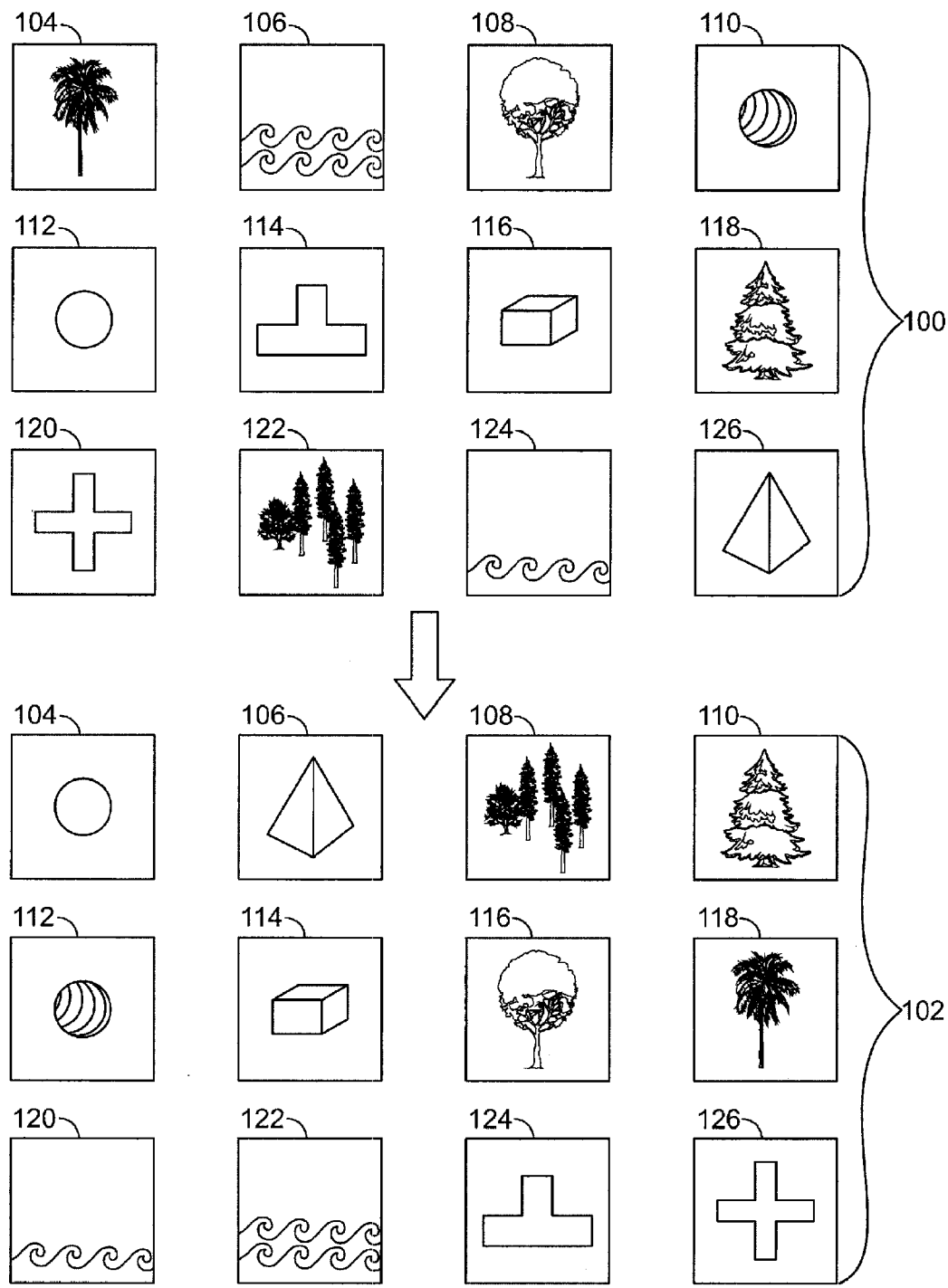
FIG. 1 illustrates an embodiment of a collection of cells where each cell contains an image from a set of images.

FIG. 1 illustrates an embodiment of a collection of cells 100 where each cell contains an image from a set of images. The images are presented in no particular order. Some of the cells contain images with similar subject matter, for example. Cells 104, 108, 118 and 122 contain images of trees. Cells 106 and 124 contain images of water. Cells 110 and 112 contain images of circles. Cells 114 and 120 contain images of geometric shapes incorporating rectangles. Finally, cells 116 and 126 contain images of three dimensional (3-D) geometric shapes. Notice that the related images of trees, water, circles, 2-D rectangular shapes, and 3-D shapes are not near to each other in the collection of cells 100. While users can visually scan the twelve cells in collection 100 and identify like images, if the number of cells is greatly increased, for example, this task can become unreasonable especially if, unlike this example, common traits are less apparent.

However, by automatically placing similar images in cells near to each other, it becomes easier for users to identify patterns in the set of images, including very large sets of images. For example, the collection of cells 102 can be obtained by clustering images according to their subject matter. Notice that the tree images are clustered in cells 108, 110, 116 and 118; the circle images are clustered in cells 104 and 112; the 2-D rectangular shapes are clustered in cells 124 and 126; the 3-D shapes are clustered in cells 106 and 114; and the water images are clustered in cells 120 and 122.

Figure 2:
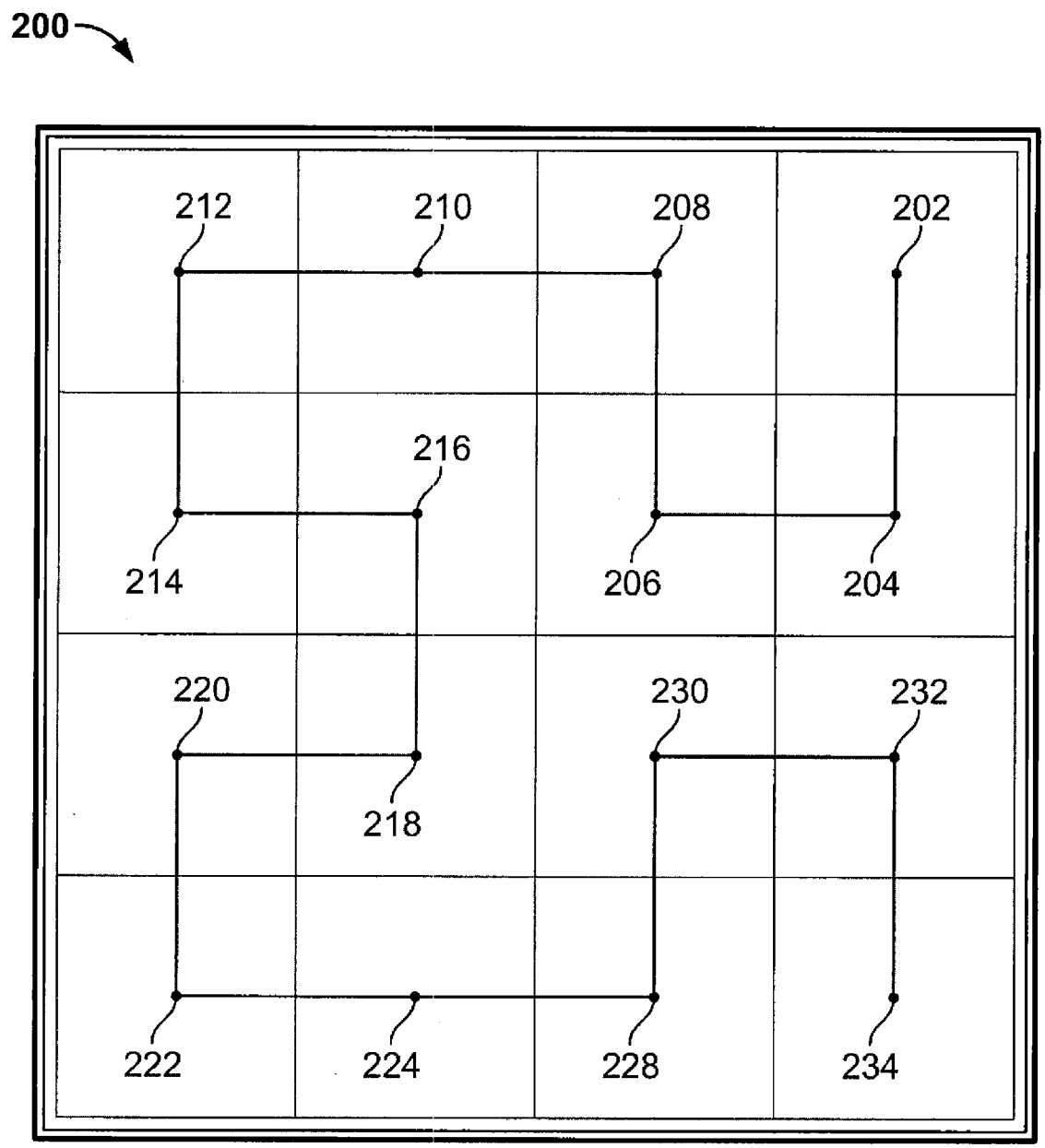
FIG. 2 illustrates an embodiment of a space filling curve applied to a 4×4 grid 200 of cells.

FIG. 2 illustrates an embodiment of a Hilbert curve applied to a 4×4 grid 200 of cells. A Hilbert curve is a space filling curve that visits every cell once in a square grid having a size k×k cells, where k is a power of two and cells visited in succession are neighboring cells. The order of visitation by a space filling curve creates a path through the grid. Other space filling curves can be used such as, but not limited to, Peano curves, Morton curves and Sierpinsky curves.

Generally, if there is a set of objects (e.g., images, sounds, music, documents, web pages) that can be sequentially ordered according to one or more attributes of the objects, a visual representation of each object (e.g., a thumbnail image) can be assigned to a cell along the path such that objects near each other in the sequential ordering will have visual representations near each other in the grid. An attribute can be, without limitation, text, a property of an object, metadata, an object's creation date, an object's modification date, and any other information that can be used to order objects sequentially. An attribute can also be determined dynamically based on observing similarities or differences between two or more objects (e.g., visual similarity between a pair of images or musical similarity between a pair of songs).

In one embodiment a sequential ordering for the images in cell collection 102 (FIG. 1) could be based on subject matter where, for example, trees come before 3-D objects in the ordering, circles come before waves, and waves come before 2-D rectangular objects.

The visual representation of the first object in a sequential ordering, for example, would be presented in the first cell on the path (i.e., cell 202). Likewise, the visual representation of a second object in the sequential ordering would be presented in the second cell (i.e., cell 204) on the path, and so on. In one implementation, such placement of visual representations results in the distance between any pair of visual representations in the grid being proportional to the square root of the separation of their associated objects in the sequential ordering.

Figure 3:
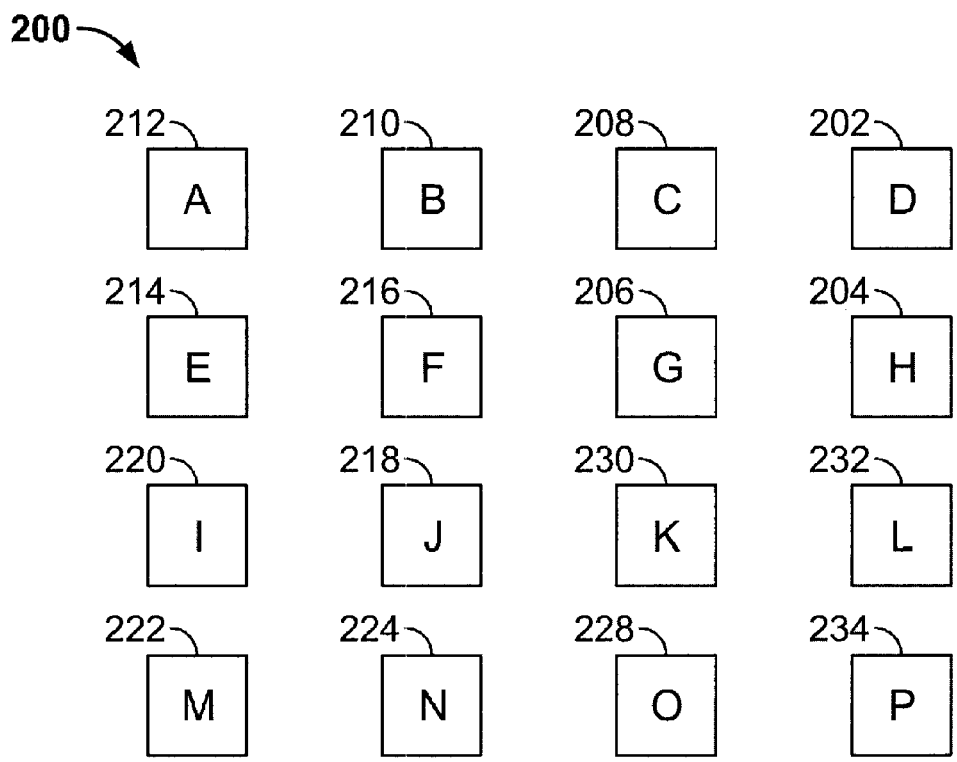
FIGS. 3 and 4 illustrate an embodiment of an application of a space filling curve to clustering visual representations of letters in the alphabet.
Figure 4:
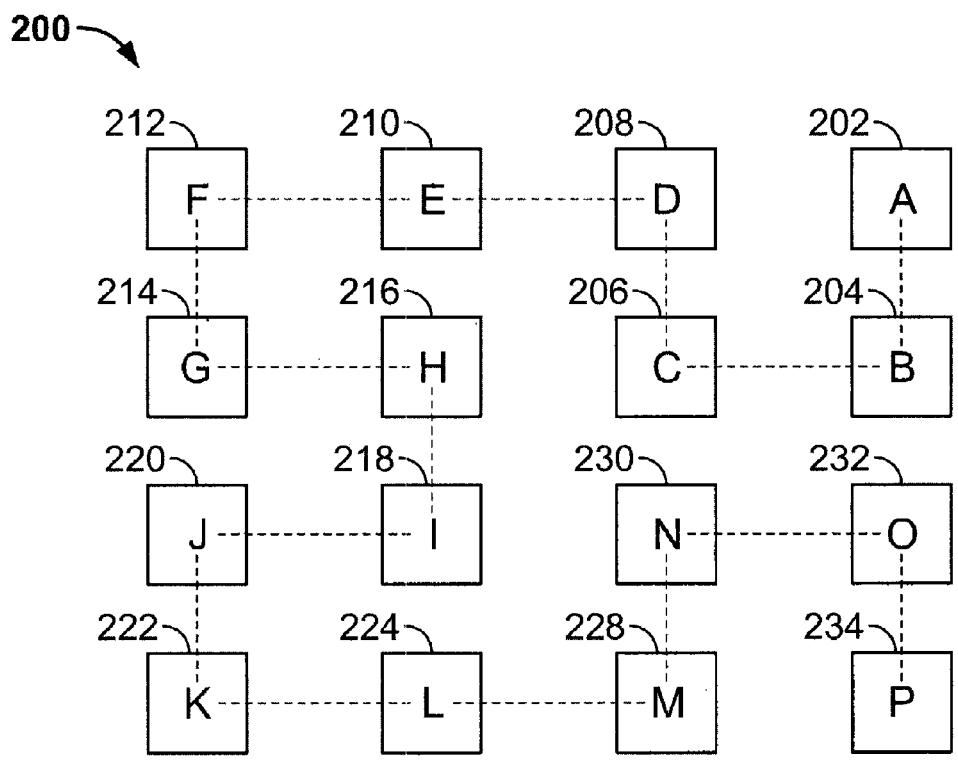

FIGS. 3 and 4 illustrate application of an embodiment of a Hilbert curve to clustering visual representations of letters in the alphabet. FIG. 3 shows the grid 200 where each cell in the grid presents a different letter in the alphabet. The letters are in row-wise alphabetical order from left to right. Notice that arranging the letters in rows does not keep neighboring letters together. For example, the alphabetically adjacent letters D and E, in cells 202 and 214, are not visually adjacent to each other.

FIG. 4 shows the same grid 200 but with alphabetically close letters clustered based on using the Hilbert curve illustrated in FIG. 2. By way of illustration, each object representing a letter can have an attribute having a value equal to the American Standard Code for Information Interchange (ASCII) numeric value of the letter it represents. The objects can be alphabetically ordered based on this value. Then each object's associated visual presentation in the sequence can be assigned to the corresponding cell as determined by the path. In this example, the first cell visited by the curve is cell 202 and it will contain the visual representation of the first object in the sequence, the letter 'A'. The ninth cell visited by the curve is cell 218 and it contains the ninth object in the sequence, the letter 'I'. The last cell visited by the curve is cell 234 and it contains the last object in the sequence, the letter 'P'. Notice that letters alphabetically near each other appear so in the grid. For example, the alphabetically adjacent letters D and E are now visually adjacent to each other in cells 208 and 210.

Figure 5:
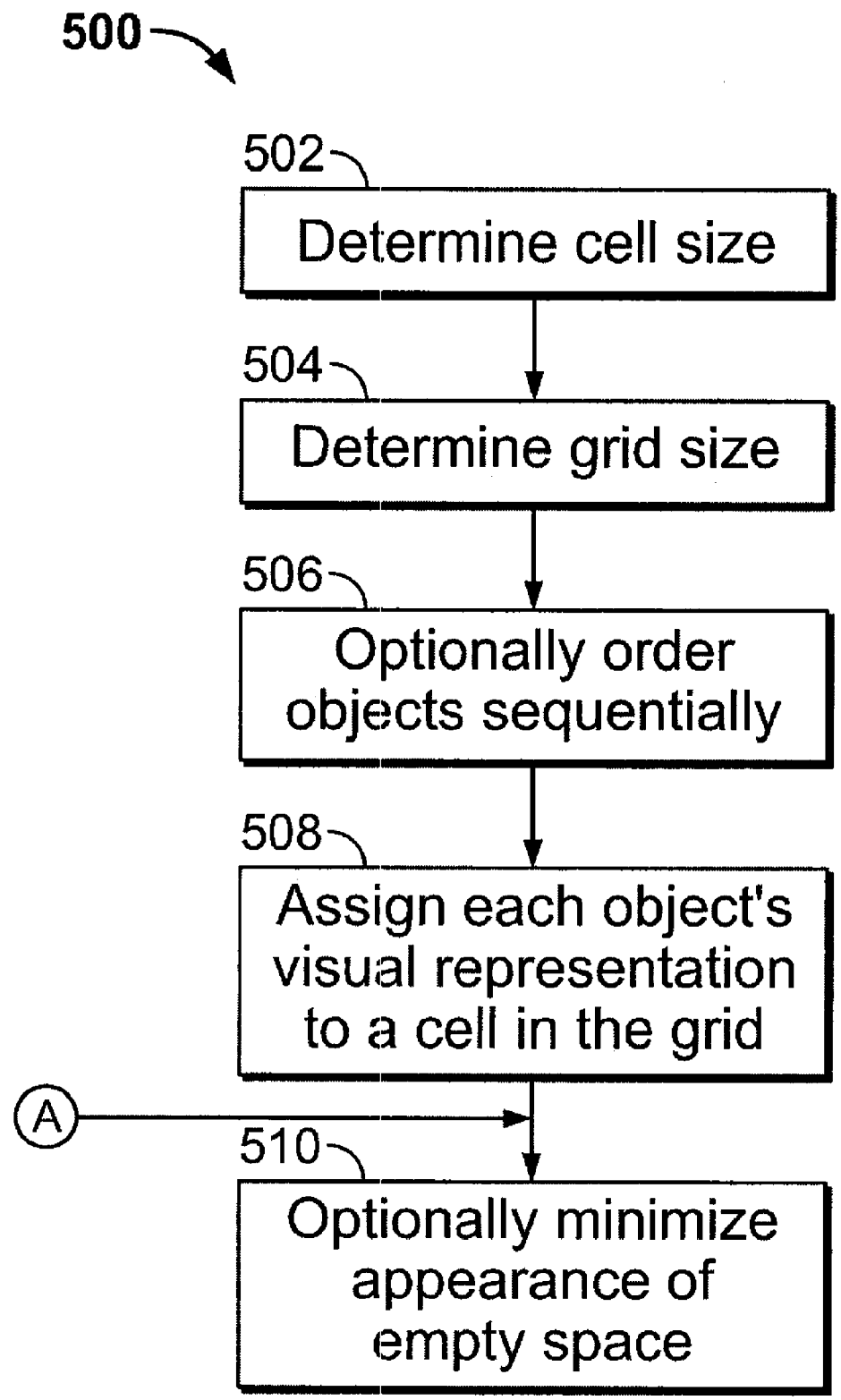
FIG. 5 is a flow diagram illustrating how visual representations of objects can be presented in a clustered fashion using a space filling curve.

FIG. 5 is a flow diagram illustrating an embodiment of how visual representations of objects can be presented in a clustered fashion using a space filling curve. Initially, a cell size can be determined (step 502). A cell size can be chosen that is large enough to accommodate the largest visual representation of an object (or scaled visual representation of an object) in a set of objects. Alternatively, a default cell size can be chosen that can be used in multiples for large visual representations of objects or singularly for representations only requiring one cell.

A grid size can be determined based on the number of cells required q to present visual representations of the set of objects (step 504). In one implementation, the grid size is equal to the $\sqrt{q} \times \sqrt{q}$, if $\sqrt{q}$ is a power of two. If $\sqrt{q}$ is not a power of two, then the grid size is $f(\sqrt{q}) \times f(\sqrt{q})$, where f yields the next higher power of two. For example, if q=32 cells are required, the grid size would be $f(\sqrt{32}) \times f(\sqrt{32}) = f(5.6568) \times f(5.6568) = 8 \times 8$.

The set of objects is optionally sequentially ordered based on one or more attributes of the objects, if it is not already so ordered (step 506). In one embodiment users can use a graphical user interface (GUI) to specify how the objects are to be ordered, such as by selecting an item in a drop down menu. For example, if the set of objects represent web pages satisfying a query, the web pages could be ordered by relevancy. By way of a further example, if the set of objects represent non-visual information such as sounds (e.g., samples from popular music), the objects could be ordered by beats per minute or other acoustic properties. A visual representation of an object that does not represent visual information could be derived from attributes of the object. The visual representation of a sound might be a 2-D waveform from a sample of the sound or the entire sound, or one or more symbols characterizing the sound such as a red drum icon indicating a very high beats per minute ratio and a blue drum representing a low beats per minute ratio.

For each object in the sequence in sequential order beginning with the first object, each object's visual representation is assigned to one or more cells in the grid according to a space filling curve traversal of the cells (step 508). This incorporates the visual representation in a visual presentation of the grid. (Step 508 is further illustrated in FIG. 6.) A visual representation can occupy an area defined by the cell or an area offset from the cell.

If there is any empty space in the grid due to allowing for different size visual representations (i.e., representations that occupy more than a single cell) or for other reasons, the empty space can optionally be compensated for to minimize its appearance (step 510). In one implementation, the visual representations can be spread out along the path so that empty space along the path or at the end of the path is distributed between visual representations.

Figure 6:
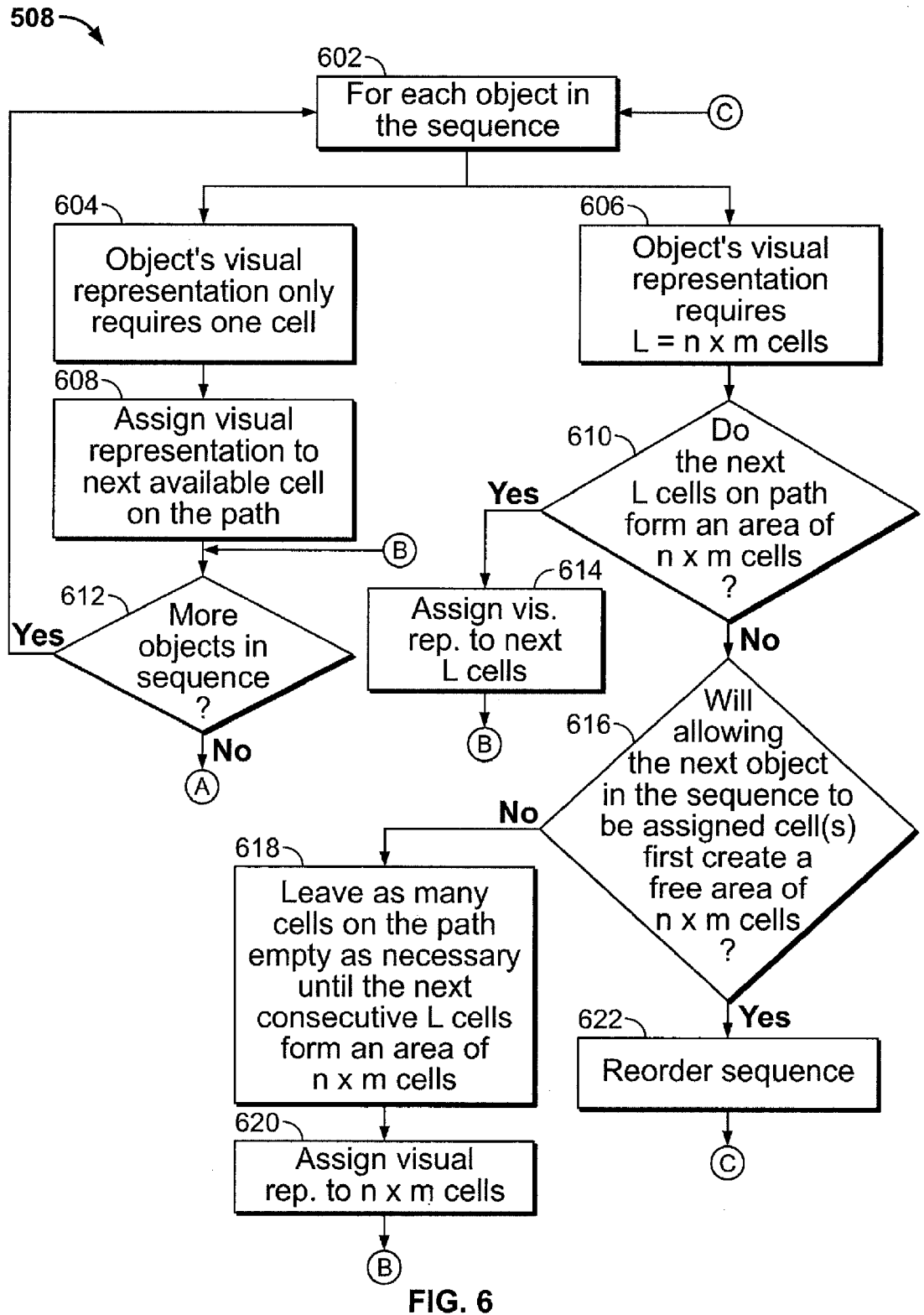
FIG. 6 illustrates a portion of FIG. 5 in greater detail.

FIG. 6 illustrates an embodiment of step 508 from FIG. 5 in greater detail. Each object in the ordered sequence of objects, in order of the sequence, is considered for assignment to one or more cells (step 602). The "current" object is the object being considered. If the current object's visual representation only requires one cell (step 604), the visual representation is assigned to the next available cell on the space filling curve's path (step 608). If there are more objects to consider in the sequence (step 612), the process continues (step 602).

If the object's visual representation requires L=n×m cells (step 606), a determination is made as to whether the next consecutive available L cells on the path form an area of n×m cells (step 610). If so, the visual representation is assigned to these cells (step 614) and the process continues (step 612).

Optionally, if the next consecutive available L cells on the path do not form an area of n×m cells, then a determination is made as to whether allowing the next object in the sequence to be assigned cell(s) first (before the current object) would create a free area of n×m cells (step 616). If so, then the object sequence is reordered by placing the current object after the next object in the sequence (step 622) and continuing processing (step 602).

Figure 10:
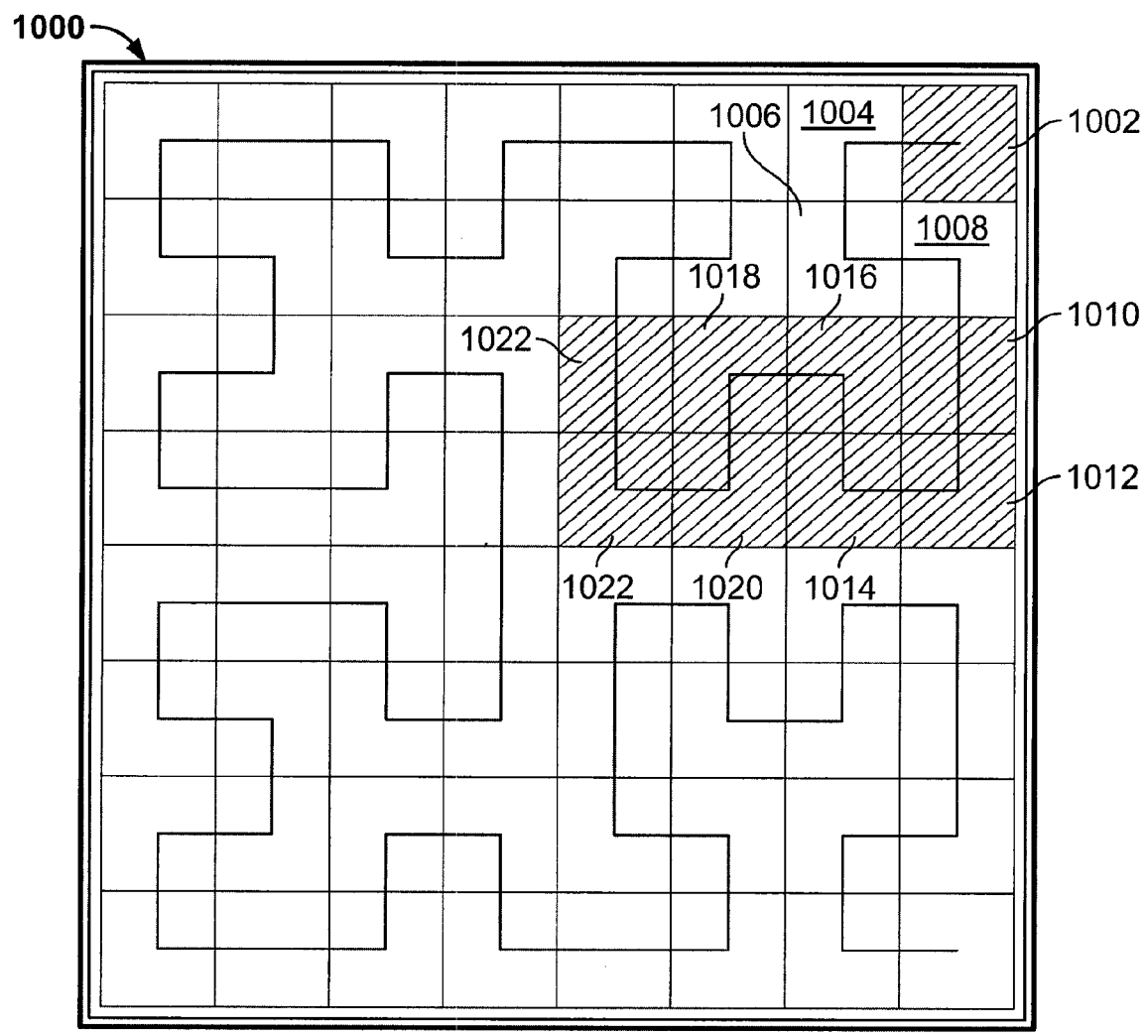
FIG. 10 shows an 8×8 grid.

For example, FIG. 10 shows an embodiment of an 8×8 grid 1000. Cell 1002 is already assigned to a visual representation. The next available cell on the path is 1004. Assuming for illustrative purposes that the current object's visual representation requires L=8 consecutive cells along the path in a 2×4 area, the next area of that size along the path begins at cell 1010 and ends at cell 1022. Step 616 will examine the next object in the sequence to see if one or more of the cells before 1010 (i.e., 1004, 1006 and 1008) can be assigned to the next object's visual representation. If so, then the current object is placed in sequence behind the next object.

In an alternative implementation, the object sequence can be reordered within limits so that the number of skipped cells is minimized. For example, assuming that up to the next five objects in the sequence can be reordered, the order of those five objects can be changed so that the fewest number of skipped cells are present.

If the next object cannot be assigned to cells before the current object (i.e., because the next object requires too many cells or an unavailable cell area), then as many consecutive cells on the path as are required to reach a free area of n×m cells are skipped and left as empty space (step 618). For example, in FIG. 10 the cells 1004, 1006 and 1008 would be left as empty. Once the appropriate sized area is found, the visual representation of the current object is assigned to it (step 620) and processing continues (step 612).

Figure 7:
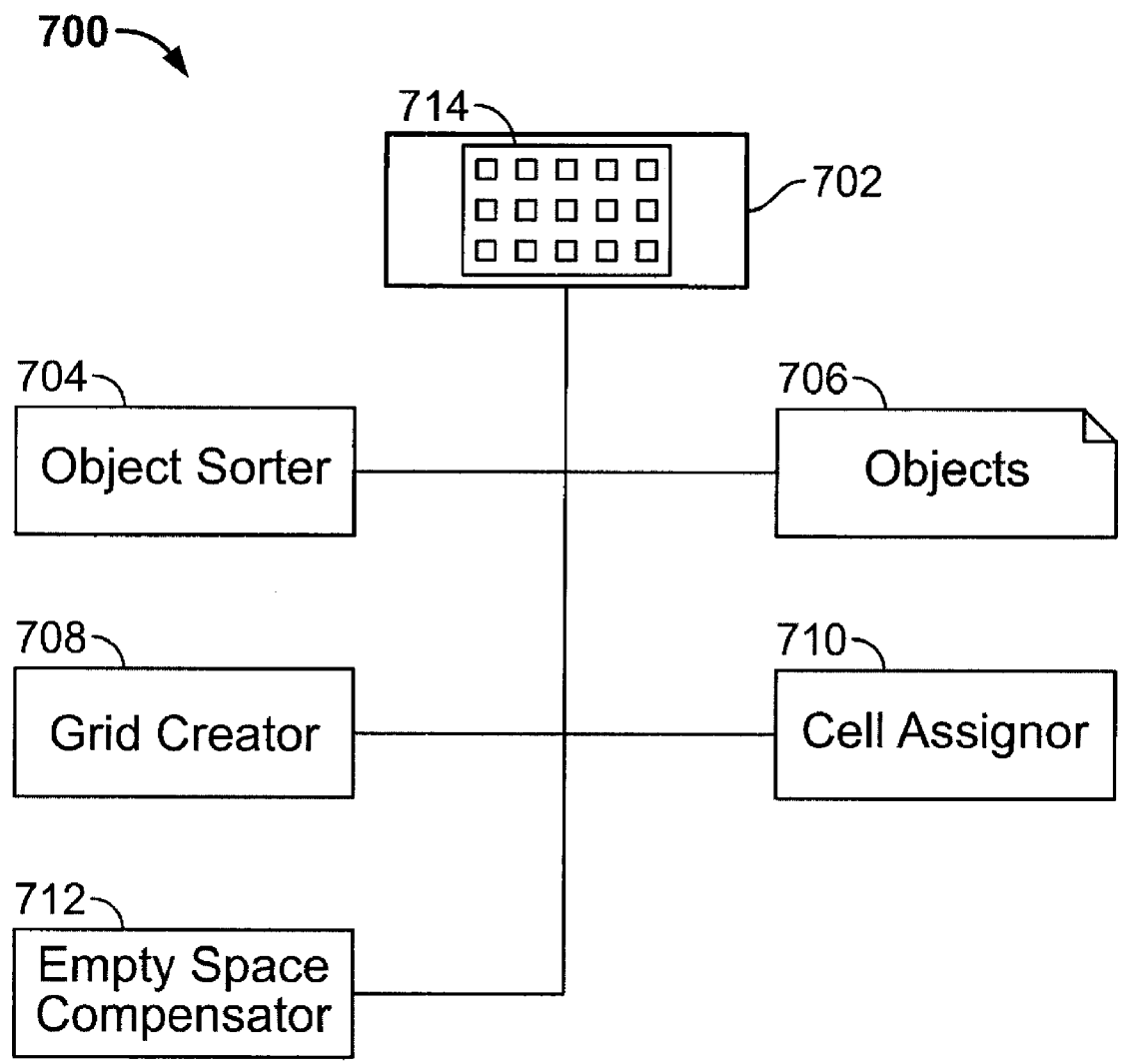
FIG. 7 illustrates an embodiment of a system for visually clustering related information.

FIG. 7 illustrates an embodiment of a system 700 for visually clustering related information. A user interface 702 can visually present clustered presentation 714 of a multiple of visual representations each associated with one among multiple objects 706. The user interface allows a user to select an ordering for the objects 706 based on one or more common attributes of the objects, and to interactively insert and remove visual representations from the presentation (e.g., by dragging and dropping visual representations with a mouse or other input device).

Once an ordering is selected, an object sorter component 704 can be invoked by the user interface to sort the objects 704 into a sequential arrangement, if they have not already been sorted. A grid generator component 708 can be invoked to determine the appropriate cell and grid sizes based on the visual representations associated with the objects. Using the grid and cell sizes, a cell assignor component creates the clustered presentation 714, as described above. Empty space can be compensated for by the empty space compensator component 712.

In one embodiment, users can interactively modify the clustered presentation 714 in the user interface 702 by, for example, interactively performing an action such as dragging and dropping visual representations to or from the clustered presentation 714 to effect insertion or removal of objects to or from the sequential arrangement. In one implementation, when users perform an action to insert a visual representation, the associated new object is added to the objects 706 and the object sorter 704 is invoked (if necessary) to sort the objects 706. One or more of the grid creator 708, the cell assignor 710 and the empty space compensator 712 can be invoked to refresh the clustered presentation 714 so that it contains the visual representation of the new object. When users perform an action to remove a visual representation, the associated object can be removed from the objects 706 and one or more components can be invoked to refresh the clustered presentation 714 so that it no longer includes the removed visual representation.

The system 700 can be implemented with fewer or more components, and components can be distributed across two or more computing devices connected by one or more networks, shared memory, or other suitable means of communication.

Figure 8:
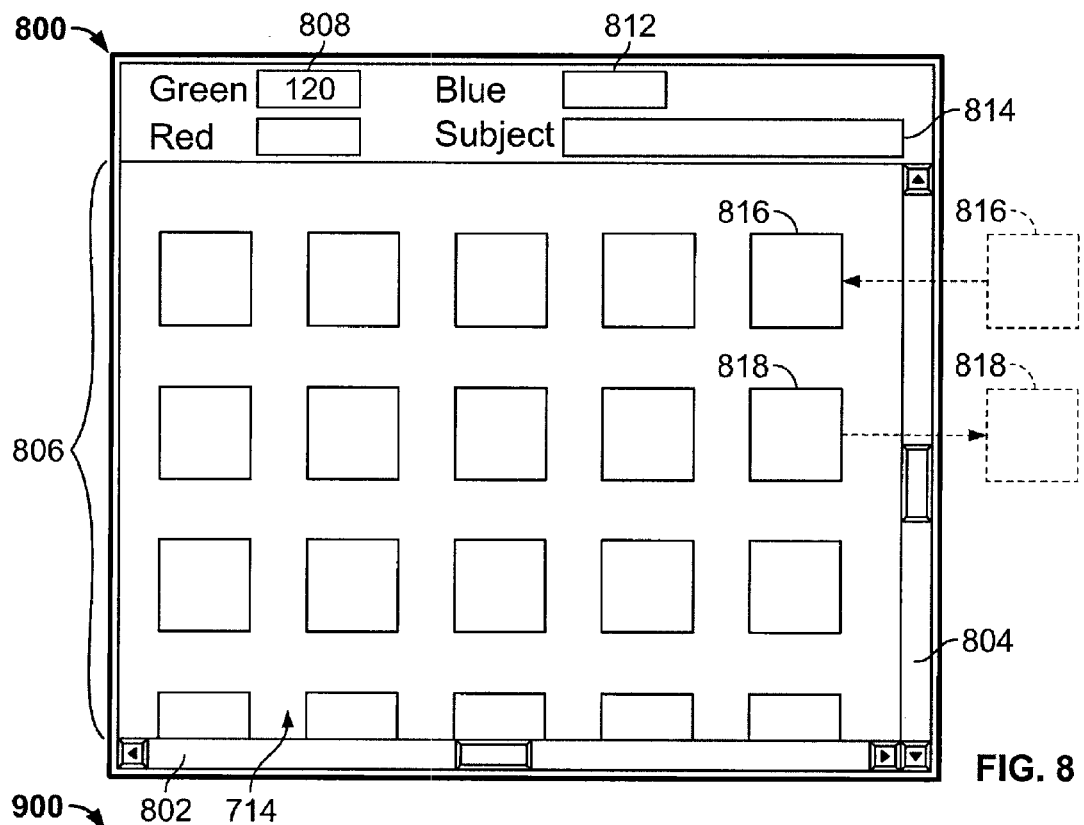
FIG. 8 shows an embodiment of a user interface for clustering visual representations of objects representing images.

FIG. 8 shows an embodiment of a user interface 800 for clustering visual representations of objects representing images. A region 806 exposes all or a portion of the clustered presentation 714. The region 806 can be scrolled using vertical 804 or horizontal 802 scroll bars, if necessary to show visual representations that are outside of the region 806. In this example, image attributes that can be used for clustering are color values which can be specified by users in fields 808, 810 and 812. For example, a green color value of 120 has been specified, meaning objects will be sorted according to the delta between their green color attribute value and 120. Alternatively or in addition, users can specify image subject matter in field 814. One or more of these attributes can be used to sort the images and then present them in a clustered fashion along a path defined by a space filling curve.

As discussed above, users can perform user interface actions to add or remove image representations to or from the region 806. For example, image representation 818 can be removed from the clustered presentation by dragging it (indicated by dashed lines) outside of the region 806. Similarly, image representation 816 can be inserted into the clustered presentation by dragging it into the region 806. Other common users actions for image representations (e.g., copying, pasting, and launching in an editor or viewer) can also be invoked.

Figure 9:
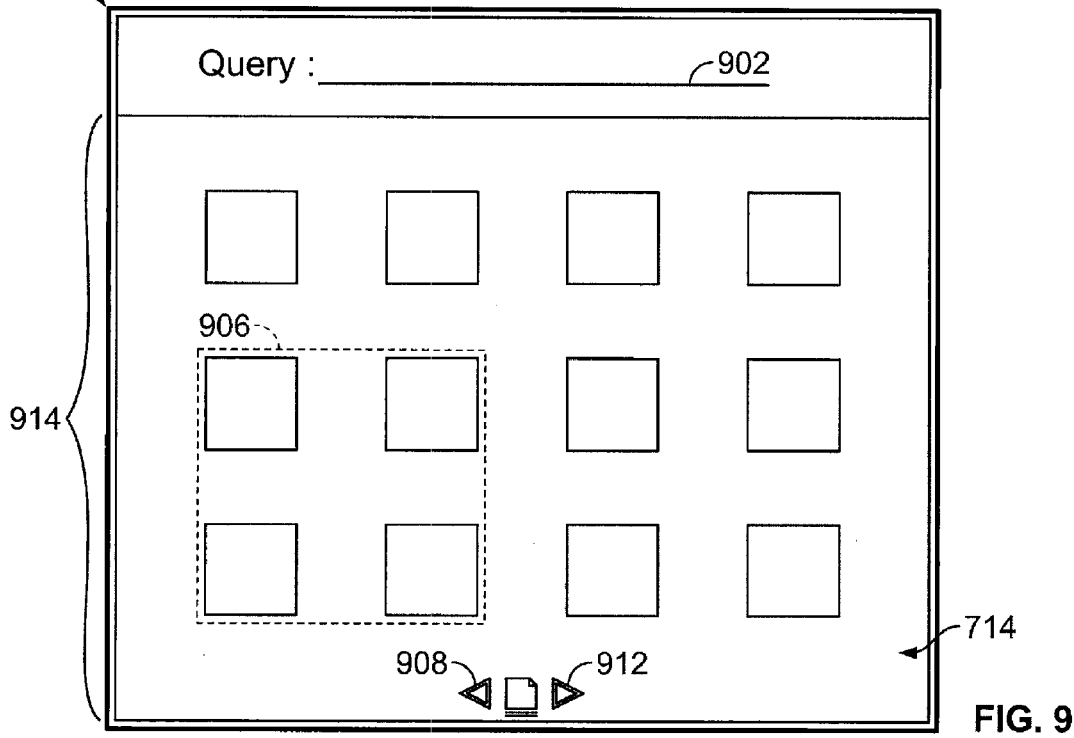
FIG. 9 shows an embodiment of a user interface for clustering visual representations of objects representing web pages.

FIG. 9 shows an embodiment of a user interface 900 for clustering visual representations of objects representing web pages. The user interface 900 includes a query field 902 that allows users to enter search text to find relevant web pages. The clustered presentation 714 of the web pages is presented in region 914. For example, the visual representations of web pages can be clustered according to relevance, date of last modification, or combinations of these. Users can then interactively select a visual representation of a web page from region 914 in order to find more web pages like the one corresponding to the selected visual representation.

In one implementation, the originally found web pages as well as web pages that are similar to the selected visual representation can be presented together in the clustered presentation 714. For example, each of the originally found web pages in response to the query can have an index attribute which represents the web page's sequential relevance order, e.g., 1.0, 1.2, 1.3, . . . 1.n. A selected web page, for example, has an order attribute of 1.8. The web pages similar to the selected web page can be given index values of 1.8.0, 1.8.1, 1.8.2 . . . 1.8.m. In this way, both the top level query web pages and the web pages similar to the selected web page can be presented in the same clustered representation by sorting the web pages on their order attribute. For example, the dotted rectangle 906 could represent the web pages that are similar to 1.8 within the clustered presentation 714. If the clustered presentation is larger than region 914, it can be spread across multiple pages accessible by, for example, page forward 908 and backward 910 buttons.

Embodiments of the invention and all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer-readable medium for execution by, or to control the operation of, data processing apparatus. The computer-readable medium can be a machine-readable device, e.g., a machine-readable storage device, storage medium, or memory device, or multiple ones of them; or it can be a tangible machine-readable propagated signal. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Information carriers suitable for storing computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Particular embodiments of the invention have been described. Other embodiments are within the scope of the following claims. For example, the actions recited in the claims can be performed in a different order and still achieve desirable results.

What is claimed is:

1. A computer implemented method, comprising:
obtaining, by a computer, selection of an ordering for a plurality of objects, each object in the plurality having one or more associated attributes and an associated visual representation, the selected ordering specifying a sequential arrangement of the plurality of objects based on the one or more associated attributes;
defining a path through a grid of cells according to a space-filling curve;
providing a visual representation of each object in a first set of objects in the sequential arrangement in a respective cell along the path in order of the sequential arrangement;
determining that a visual representation of a second object that follows the first set of objects in the sequential arrangement requires a region of n by m of cells;
responsive to the determining, providing a visual representation of a third object that follows the second object in the sequential arrangement in a cell corresponding to a position on the path following the cells of the first objects in order of the sequential arrangement; and
providing a visual representation of the second object in a region of n by m cells on the path following the third cell.

2. The computer implemented method of claim 1, where:
the distance between any two visual representations in the visual presentation is proportional to the distance between the corresponding objects in the sequential arrangement.

3. The computer implemented method of claim 1, further comprising:
receiving a user action to insert a new visual representation associated with a new object in the visual presentation;
modifying the sequential arrangement by adding the new object to the sequential arrangement at a location determined by the selected ordering; and
presenting the modified sequential arrangement in the visual presentation by presenting for each object in the sequential arrangement the associated visual representation at a position on the path defined by the space filling curve.

4. The computer implemented method of claim 1, further comprising:
receiving user selection of a visual representation in the visual presentation;
modifying the sequential arrangement by removing the object associated with the visual representation from the sequential arrangement; and
presenting the modified sequential arrangement in the visual presentation by presenting for each object in the sequential arrangement the associated visual representation at a position on the path defined by the space filling curve.

5. The computer implemented method of claim 1, where:
distributing one or more visual representations so as to compensate for empty space.

6. The computer implemented method of claim 1, where:
an object incorporates one or more of: text, an image, sound, a web page or a document.

7. The computer implemented method of claim 1, where:
an attribute is one or more of: text, an image property, metadata, an object creation date, an object modification date, or determined by attributes of two or more objects.

8. The computer implemented method of claim 1, where:
presenting the visual representation in more than one consecutive region along the path if the visual representation is larger than a single region.

9. A computer program product, encoded on a computer-readable storage device, operable to cause data processing apparatus to perform operations comprising:
obtaining selection of an ordering for a plurality of objects, each object in the plurality having one or more associated attributes and an associated visual representation, the selected ordering specifying a sequential arrangement of the plurality of objects based on the one or more associated attributes;
defining a path through a grid of cells according to a space-filling curve;
providing a visual representation of each object in a first set of objects in the sequential arrangement in a respective cell along the path in order of the sequential arrangement;
determining that a visual representation of a second object that follows the first set of objects in the sequential arrangement requires a region of n by m of cells;
responsive to the determining, providing a visual representation of a third object that follows the second object in the sequential arrangement in a cell corresponding to a position on the path following the cells of the first objects in order of the sequential arrangement; and
providing a visual representation of the second object in a region of n by m cells on the path following the third cell.

10. The computer program product of claim 9, where:
the distance between any two visual representations in the visual presentation is proportional to the distance between the corresponding objects in the sequential arrangement.

11. The computer program product of claim 9, operable to cause the data processing apparatus to perform further operations comprising:
receiving a user action to insert a new visual representation associated with a new object in the visual presentation;
modifying the sequential arrangement by adding the new object to the sequential arrangement at a location determined by the selected ordering; and
presenting the modified sequential arrangement in the visual presentation by presenting for each object in the sequential arrangement the associated visual representation at a position on the path defined by the space filling curve.

12. The computer program product of claim 9, operable to cause the data processing apparatus to perform further operations comprising:
receiving user selection of a visual representation in the visual presentation;
modifying the sequential arrangement by removing the object associated with the visual representation from the sequential arrangement; and
presenting the modified sequential arrangement in the visual presentation by presenting for each object in the sequential arrangement the associated visual representation at a position on the path defined by the space filling curve.

13. The computer program product of claim 9, where:
distributing one or more visual representations so as to compensate for empty space.

14. The computer program product of claim 9, where:
an object incorporates one or more of: text, an image, sound, a web page or a document.

15. The computer program product of claim 9, where:
an attribute is one or more of: text, an image property, metadata, an object creation date, an object modification date, or determined by attributes of two or more objects.

16. A system comprising:
a data processing apparatus configured to perform operations comprising:
obtaining selection of an ordering for a plurality of objects, each object in the plurality having one or more associated attributes and an associated visual representation, the selected ordering specifying a sequential arrangement of the plurality of objects based on the one or more associated attributes;
defining a path through a grid of cells according to a space-filling curve;
providing a visual representation of each object in a first set of objects in the sequential arrangement in a respective cell along the path in order of the sequential arrangement;
determining that a visual representation of a second object that follows the first set of objects in the sequential arrangement requires a region of n by m cells;
responsive to the determining, providing a visual representation of a third object that follows the second object in the sequential arrangement in a cell corresponding to a position on the path following the cells of the first objects in order of the sequential arrangement; and
providing a visual representation of the second object in a region of n by m cells on the path following the third cell.

* * * * *